United States Patent
Army et al.

(10) Patent No.: US 8,132,758 B2
(45) Date of Patent: Mar. 13, 2012

(54) ENVIRONMENTAL CONTROL SYSTEM PACK PALLETS

(75) Inventors: Donald E. Army, Enfield, CT (US); Frederick Peacos, North Scituate, RI (US); John Polifka, San Diego, CA (US); Michael Zager, Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1036 days.

(21) Appl. No.: 12/047,179

(22) Filed: Mar. 12, 2008

(65) Prior Publication Data

US 2009/0230243 A1 Sep. 17, 2009

(51) Int. Cl.
*B64D 11/00* (2006.01)
*B64C 1/22* (2006.01)

(52) U.S. Cl. ............... 244/118.5; 244/137.1; 244/118.1

(58) Field of Classification Search .............. 244/118.5, 244/118.1, 137.4, 137.1; 62/457.9, 498
See application file for complete search history.

(56) References Cited

U.S. PATENT DOCUMENTS

| | | | |
|---|---|---|---|
| 2,634,656 A * | 4/1953 | Woollens et al. | 89/1.51 |
| 2,998,948 A * | 9/1961 | Sisk | 244/137.1 |
| 4,306,693 A * | 12/1981 | Cooper | 244/135 R |
| 4,419,926 A * | 12/1983 | Cronin et al. | 454/74 |
| 4,523,517 A | 6/1985 | Cronin | |
| 5,114,103 A | 5/1992 | Coffinberry | |
| 5,125,597 A | 6/1992 | Coffinberry | |
| 5,137,230 A | 8/1992 | Coffinberry | |
| 5,141,182 A | 8/1992 | Coffinberry | |
| 5,143,329 A | 9/1992 | Coffinberry | |
| 5,337,579 A * | 8/1994 | Saia et al. | 62/239 |
| 6,478,253 B1 | 11/2002 | Seidel | |
| 6,634,597 B2 | 10/2003 | Johnson et al. | |
| 6,681,592 B1 | 1/2004 | Lents et al. | |
| 6,928,832 B2 | 8/2005 | Lents et al. | |
| 7,188,488 B2 | 3/2007 | Army, Jr. et al. | |
| 7,207,521 B2 | 4/2007 | Atkey et al. | |
| 7,210,653 B2 | 5/2007 | Atkey et al. | |
| 7,252,263 B1 | 8/2007 | Hagemeister et al. | |
| 7,305,842 B1 | 12/2007 | Schiff | |
| 2007/0069078 A1 * | 3/2007 | Hoffjann et al. | 244/129.1 |
| 2009/0146010 A1 * | 6/2009 | Cohen | 244/137.1 |
| 2009/0212047 A1 * | 8/2009 | Harman et al. | 220/1.5 |

* cited by examiner

*Primary Examiner* — Tien Dinh
(74) *Attorney, Agent, or Firm* — Carlson Gaskey & Olds P.C.

(57) ABSTRACT

An Environmental Control System (ECS) includes a pallet which supports at least one ECS component. The pallet defines a pallet surface that matches an aircraft outer mold line.

17 Claims, 3 Drawing Sheets

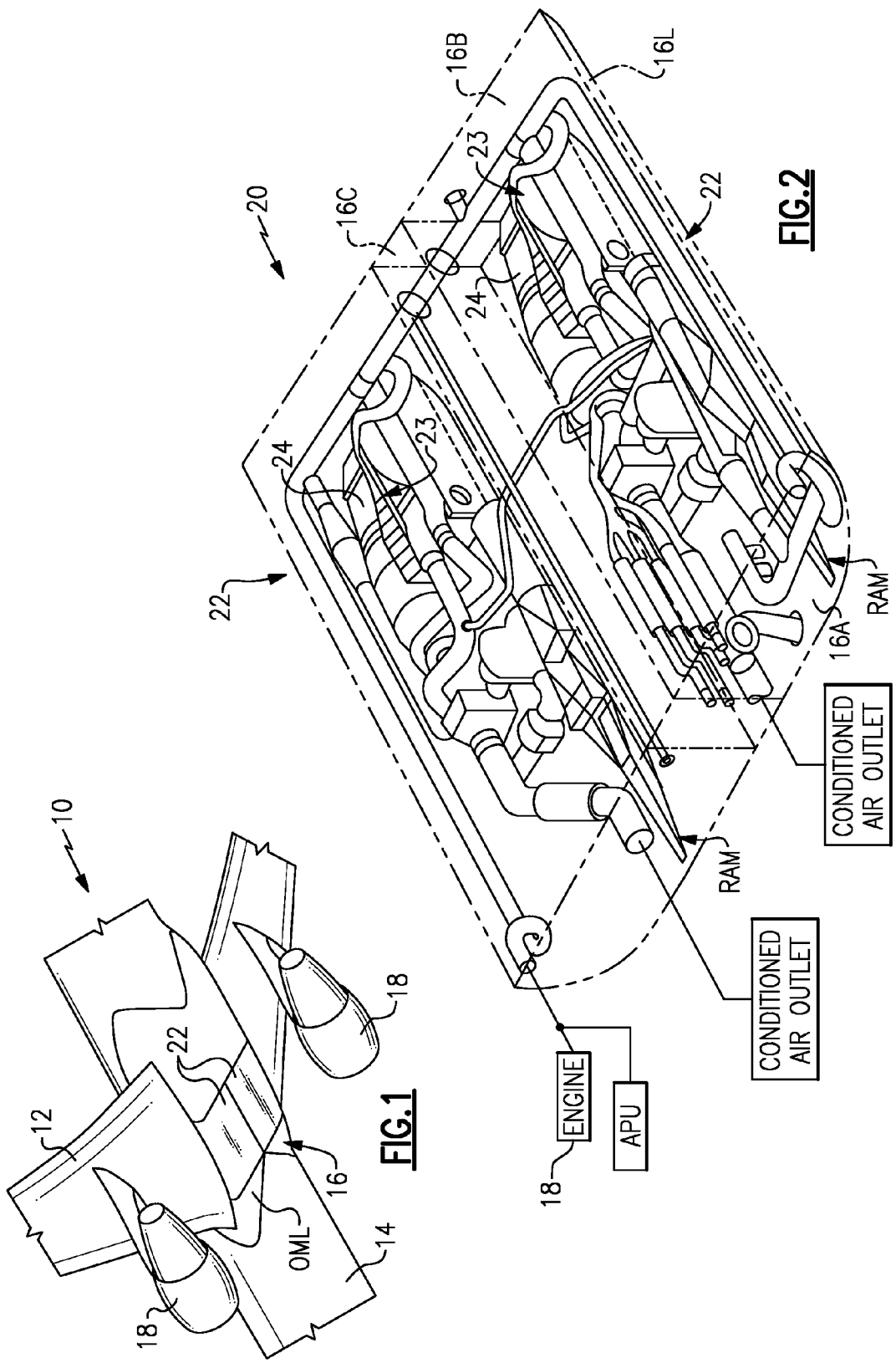

ENVIRONMENTAL CONTROL SYSTEM PACK PALLETS

BACKGROUND

The present invention relates to an aircraft environmental control system, and more particularly to a palletized arrangement therefor.

Aircraft typically include an environmental control system (ECS) with redundant air-conditioning ECS packs. The ECS packs provide essentially dry, sterile, and dust free conditioned air to the cabin at the proper temperature, flow rate, and pressure to satisfy pressurization and temperature control requirements.

The ECS packs are typically located under the wing at the center of the aircraft. Hinged access panels form the Outer Mold Line (OML) of the aircraft and provide access to the ECS pack. Although effective, this type of conventional pack mount arrangement may limit pack access from only one direction—upward from beneath the wing.

SUMMARY

An Environmental Control System (ECS) pack according to an exemplary aspect of the present invention includes at least one ECS component; and a pallet which supports the at least one ECS component, the pallet defines a pallet surface that matches an aircraft outer mold line.

An aircraft according to an exemplary aspect of the present invention includes a pallet which supports an ECS pack, the pallet mountable to a first spar and a second spar to enclose a bay. The pallet defines a pallet surface that matches an aircraft outer mold line.

A method of mounting an Environmental Control System (ECS) Pack to an aircraft according to an exemplary aspect of the present invention includes mounting at least one ECS component to a pallet; and installing the pallet to an aircraft such that a pallet surface matches an aircraft outer mold line.

BRIEF DESCRIPTION OF THE DRAWINGS

The various features and advantages of this invention will become apparent to those skilled in the art from the following detailed description of the disclosed non-limiting embodiment. The drawings that accompany the detailed description can be briefly described as follows:

FIG. 1 is a general perspective view of one exemplary aircraft embodiment for use with the present invention;

FIG. 2 is an expanded view of two ECS packs mounted within a wing box interface area;

DETAILED DESCRIPTION OF THE EXEMPLARY EMBODIMENTS

Figure 3:
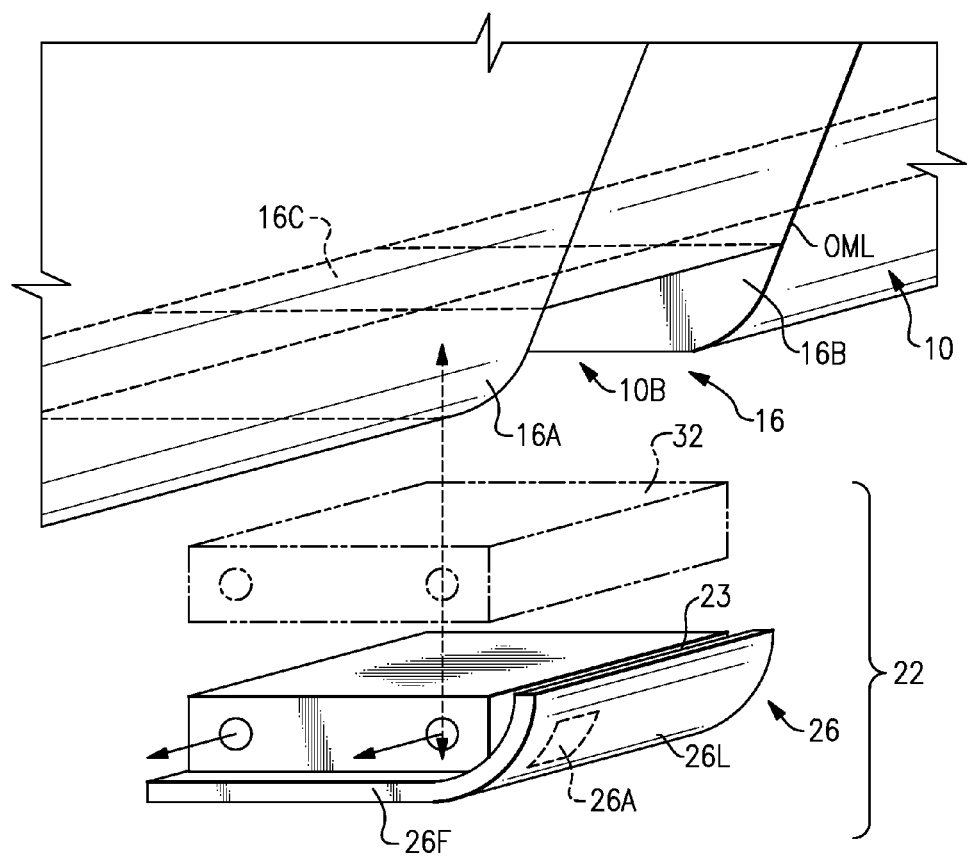
FIG. 3 is an exploded view of one ECS pack.

FIG. 1 schematically illustrates an aircraft 10 having a wing 12 which attaches to a fuselage 14 in a wing box interface area 16 between the fuselage 14 and wing 12. The wing 12 typically supports two or more engines 18. Although a particular aircraft configuration is illustrated in the disclosed embodiment, other aircraft types will also benefit from the present invention.

An Environmental Control System (ECS) 20 typically includes a multiple of various ECS components 23 such as, for example only, a vapor cycle system, turbocompressors, regulating valves, heat exchangers, and other components which are packaged relatively close together to define an ECS pack 22 (FIG. 2). The ECS components 23 of the ECS pack 22 provides an air cycle refrigeration system that utilizes ambient RAM air as a refrigerant though a combined turbine and compressor machine—commonly referred to as an air cycle machine (ACMS) 24 (illustrated schematically). The ACMS 24 may be powered by the same bleed that is conditioned for cabin air and which is usually supplied by the gas turbine engines 18 which provide aircraft propulsion. Alternatively, cabin air compressors may be utilized and located within the ECS pack 22. The ECS pack 22 may alternatively or additionally be powered by auxiliary power units (APUs) that are separate gas turbine engines which do not provide propulsion but may in part power the ECS packs as well as other aircraft equipment. The ECS pack 22 is often located in the wing box interface area 16.

Referring to FIG. 3, a pallet 26 supports and mounts ECS components 23 of the ECS pack 22. The pallet 26 provides the framework and support structure for the ECS components 23 (FIG. 2) mounted thereto as well as defines an outer skin surface of the aircraft 10. The palletized arrangement of the ECS pack 22 facilitates ECS pack pre-assembly and test as an integrated unit which minimizes air framer labor and installation time during aircraft assembly.

The pallet 26 generally includes a framework 26F and a pallet lower surface 26L that matches the aircraft outer mold line (OML) in the wing box interface area 16. That is, the pallet lower surface 26L operates as an integrated fairing which defines an outer skin of the aircraft 10 such that when the ECS pack 22 is mounted within an ECS bay 10B of the aircraft 10, the pallet lower surface 26L matches the aircraft OML (FIG. 1). It should be understood that various surface contours which correspond to the aircraft OML may be utilized herewith and the pallet 26 should not be limited to the disclosed wing-box area 16 as other aircraft positions may be defined by the pallet lower surface 26L.

The pallet lower surface 26L may include one or more access panels 26A which facilitate final connection and adjustments where required when the ECS pack 22 is attached to the aircraft 10. That is, the access panels 26A may be relatively small, removable panels which are located at particular areas of the pallet 26 for particular functions.

The pallet 26 includes a multiple of mount points 28 (FIG. 4) which provide attachment to the aircraft 10. The mount points 28 may attach directly to a front spar 16A, a rear spar 16B and a keel beam 16C within the wing box interface area 16 such that no attachments need be provided directly to the wing and/or a center fuel tank typically contained therein as well as minimization or elimination of conventional end sheet mounts and tie rods.

The ECS pack 22 may be lowered for servicing to provide five (5) surface access (top and each of four side) to provide significant access to the ECS components 23. The increased accessibility facilitates a higher package density which results in a smaller required volume as well as increased access to other aircraft systems routed through the wing box interface area 16 when the ECS pack 22 is removed.

Various systems and methods may be utilized to raise and lower the pallet 26 such as, for example, a fish pole hoist or lift truck. The mount points 28 may alternatively include integral hoists 30 or the like to raise and lower the pallet 26. The mount points 28 may alternatively include a hinge system to facilitate access to the ECS pack 22. The pallet lower surface 26L may also include one or more access panels 26A which facilitate final connection and adjustments where required when the ECS pack 22 is attached to the aircraft 10. That is, the access panels 26A may be relatively small, removable panels which are located at particular areas of the pallet 26 for particular functions.

The ECS pack 22 also facilitates usage of a single insulation blanket 32 over all of the ECS components 23. That is, the blanket 32 replaces a multiple of individual blankets in which each blanket covers an individual ECS component.

Figure 4:
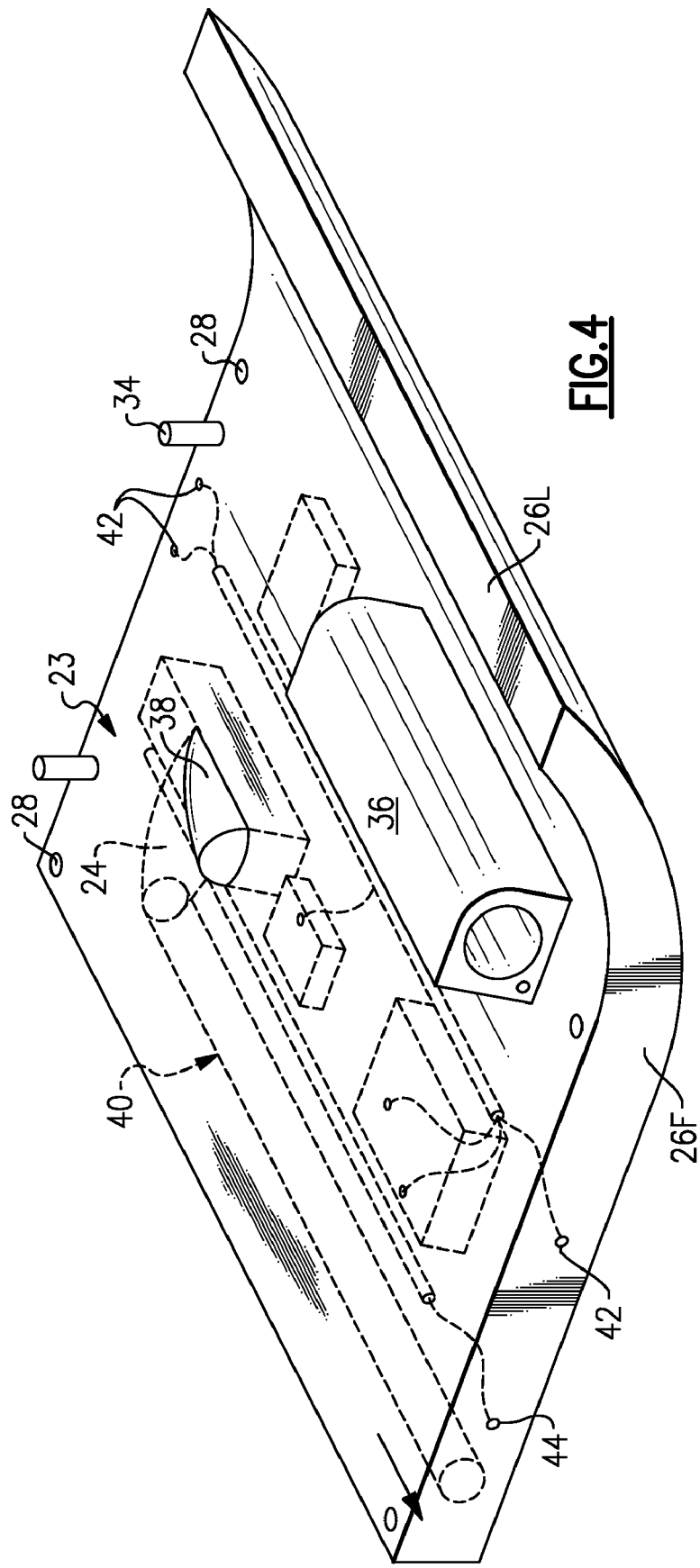
FIG. 4 is a schematic top view of one ECS pack.

Referring to FIG. 4, the ECS pack 22 may include various integration features such as guide pins 34 to position the pallet 26, a RAM inlet header 36, a RAM outlet header 38, flow ducts 40, wire harness connections 42, and current Return Network (CRN) connections 44 which facilitate interface with the aircraft 10. It should be understood that various other interfaces may alternatively or additionally be provide including, for example only, picture frame mounted heat exchangers.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A Environmental Control System (ECS) pack comprising:
   an Environmental Control System (ECS) pack comprising a multiple of ECS components; and
   a pallet which supports said multiple of ECS components, said pallet defines a pallet surface that matches an aircraft outer mold line;
   wherein said pallet is mountable within a wing box interface area of an aircraft.

2. The ECS pack as recited in claim 1, wherein said multiple of ECS components includes an Air Cycle Machine.

3. The ECS pack as recited in claim 1, wherein said pallet defines a multiple of mount points.

4. The ECS pack as recited in claim 1, wherein said pallet defines at least one access panel though said pallet surface.

5. The ECS pack as recited in claim 1, further comprising a single insulation blanket to cover said multiple of ECS components.

6. The ECS pack as recited in claim 1, wherein said pallet defines a multiple of guide pins.

7. The ECS pack as recited in claim 1, wherein said pallet defines a RAM inlet header.

8. The ECS pack as recited in claim 1, wherein said pallet defines a RAM outlet header.

9. The ECS pack as recited in claim 1, wherein said pallet defines at least one flow duct.

10. An aircraft comprising:
    a first spar;
    a second spar;
    a keel beam connected to said first spar and said second spar to at least partially define a bay;
    an Environmental Control System (ECS) pack comprising at least one ECS component installable within said bay; and
    a pallet which supports said ECS pack, said pallet mountable to said first spar and said second spar to enclose said bay, said pallet defines a pallet surface that matches an aircraft outer mold line.

11. The aircraft as recited in claim 10, wherein said bay is defined in a wing box interface area of said aircraft.

12. The aircraft as recited in claim 11, wherein said pallet surface comprises a pallet lower surface that matches said aircraft outer mold line of said wing box interface area.

13. The aircraft as recited in claim 11, wherein said pallet surface operates as a fairing that defines at least in part an outer skin of said aircraft.

14. A method of mounting an Environmental Control System (ECS) Pack to an aircraft comprising:
    mounting a multiple of ECS components to a pallet; and
    installing the pallet to an aircraft such that a pallet surface matches an aircraft outer mold line; wherein said pallet is mountable within a wing box interface area of an aircraft.

15. A method as recited in claim 14, further comprising utilizing said pallet to provide an interface between the at least one ECS component and the aircraft.

16. A method as recited in claim 14, further comprising accessing the at least one ECS component through an access panel through the pallet surface.

17. A method as recited in claim 14, further comprising covering the multiple of ECS components with a single insulation blanket.

* * * * *